(12) United States Patent
Cullum et al.

(10) Patent No.: US 8,291,374 B2
(45) Date of Patent: Oct. 16, 2012

(54) SYSTEM AND METHOD FOR GENERATING MODIFIED SOURCE CODE BASED ON CHANGE-MODELS

(76) Inventors: Owen H. G. Cullum, London (GB); Tobias J. Selwood, London (GB)

( * ) Notice: Subject to any disclaimer, the term of this patent is extended or adjusted under 35 U.S.C. 154(b) by 928 days.

(21) Appl. No.: 12/264,239

(22) Filed: Nov. 3, 2008

(65) Prior Publication Data

US 2009/0125878 A1    May 14, 2009

Related U.S. Application Data

(60) Provisional application No. 60/985,597, filed on Nov. 5, 2007.

(51) Int. Cl.
*G06F 9/44* (2006.01)
*G06F 9/45* (2006.01)
(52) U.S. Cl. ......... 717/106; 717/122; 717/136; 717/137
(58) Field of Classification Search ................... None
See application file for complete search history.

(56) References Cited

U.S. PATENT DOCUMENTS

| | | | |
|---|---|---|---|
| 5,448,740 A | 9/1995 | Kiri et al. | |
| 5,875,333 A | 2/1999 | Fish et al. | |
| 6,011,917 A | 1/2000 | Leymann et al. | |
| 6,093,215 A | 7/2000 | Buxton et al. | |
| 6,212,672 B1 * | 4/2001 | Keller et al. | 717/136 |
| 6,301,583 B1 * | 10/2001 | Zellweger | 715/810 |
| 6,370,681 B1 | 4/2002 | Dellarocas et al. | |
| 6,408,431 B1 | 6/2002 | Heughebaert et al. | |
| 6,467,079 B1 * | 10/2002 | Ettritch et al. | 717/137 |
| 6,560,771 B1 | 5/2003 | Yotsukura | |
| 6,876,314 B1 | 4/2005 | Lin | |
| 6,877,155 B1 * | 4/2005 | Lindsey | 717/137 |
| 6,993,710 B1 * | 1/2006 | Coad et al. | 715/202 |
| 6,993,759 B2 * | 1/2006 | Aptus et al. | 717/106 |
| 7,152,228 B2 * | 12/2006 | Goodwin et al. | 717/137 |
| 7,500,224 B2 * | 3/2009 | Hejlsberg et al. | 717/122 |
| 7,533,365 B1 * | 5/2009 | Hogstrom et al. | 717/106 |
| 7,849,394 B2 * | 12/2010 | Tuschner et al. | 717/106 |

(Continued)

OTHER PUBLICATIONS

Holger Giese et al.., The Fujuba Tool Suite 2005: An Overview about the Development Efforts in Paderborn, Kassel, Damstadt, Siegen, and Bayreuth, Sep. 2005, [Retrieved on Aug. 5, 2012]. Retrieved from the internet: <URL: http://131.234.16.25/pub/doc/techreports/Informatik/tr-ri-05-259.pdf#page=65> 86 Pages (1-78).*

(Continued)

*Primary Examiner* — Don Wong
*Assistant Examiner* — Anibal Rivera
(74) *Attorney, Agent, or Firm* — LaMorte & Associates, P.C.

(57) ABSTRACT

A computer implemented method for automatically generating domain specific applications based on model driven changes of the source code base for existing applications. Abstracted declarative design change-models, separate from detailed implementation source coding, are used to define the possible set of changes for specific application domains. Generalized implementations of the design changes, mapped to the defined Change-Model abstracted representations but separate from the representations themselves, are implemented via Application-Templates consisting of existing source code plus mark-up. The application domain is thus defined by the change-model linked to allied application-templates. Meta generation facilities are implicitly provided as the code generator for a specific application domain is defined by the Change-Model plus related set of Application-Templates. Additionally, the generator GUI is automatically modified or generated from the Change-Model with optional GUI model extensions definitions to tailor the generator GUI for each specific application domain.

15 Claims, 7 Drawing Sheets

U.S. PATENT DOCUMENTS

| | | | |
|---|---|---|---|
| 2002/0023261 A1* | 2/2002 | Goodwin et al. | 717/146 |
| 2002/0178434 A1 | 11/2002 | Fox et al. | |
| 2004/0216087 A1* | 10/2004 | Wilson et al. | 717/116 |
| 2005/0132326 A1* | 6/2005 | Chischportich et al. | 717/106 |
| 2006/0015856 A1 | 1/2006 | Lotter | |
| 2006/0168577 A1* | 7/2006 | Melo et al. | 717/168 |
| 2007/0067756 A1* | 3/2007 | Garza | 717/136 |
| 2007/0094609 A1* | 4/2007 | Gilboa et al. | 715/762 |

OTHER PUBLICATIONS

Alfred V. Aho et al., Code Generation Using Tree Matching and Dynamic Programming, 1989, ACM 0164-0925/89/1000-0491, [Retrieved on Aug. 5, 2012]. Retrieved from the internet: <URL: http://dl.acm.org/citation.cfm?id=75700> 26 Pages (491-516).*

* cited by examiner

SYSTEM AND METHOD FOR GENERATING MODIFIED SOURCE CODE BASED ON CHANGE-MODELS

RELATED APPLICATIONS

This application claims priority of Provisional Patent Application No. 60/985,597, entitled Change-Model Driven Modification Of Source Code, filed Nov. 5, 2007.

BACKGROUND OF THE INVENTION

1. Field of the Invention

In general, the present invention relates to systems that utilize source code generators that automatically generate source code and alter programming depending upon the inputs of a system's user. More particularly, the present invention relates to systems with automatic source code generation that modify existing source code in order to produce modified applications or completely new application variants.

2. Prior Art Description

A source code generator may be defined as a system for automating the source code construction for all or part of a software application. The source code generator is controlled from a user interface or input file, from which syntactically correct high-level source code (for example C++, C#, Java, Python, Ruby, Perl, etc.) is automatically created. The created source code can be compiled or interpreted by the appropriate computerized system and subsequently executed. Source code generators close the gap between the input design world and the final output executable-code world and are generally used in practice to minimize repetitive coding tasks and to minimize or eliminate the number of human-generated source code lines being created. In simplistic terms, a source code generator reads from the input and then uses a set of templates to produce output source code. Thus, a source code generator specifies how information is extracted from the input and transformed into source code.

The use of automated source code generation has many benefits over having a programmer write custom code. By using automated source code generation, a programmer need not focus on the writing and debugging of lines of code. Rather, a programmer can focus on the overall design and methodology of the software, thereby eliminating many abstraction problems. Furthermore, by using automated source code generation, there is a significant improvement in the consistency and quality of the code that is generated. Lower error rates can be achieved as many common coding problems can be guaranteed not to occur. Additionally, automated source code generation takes a fraction of the time to produce as compared to manual development of the equivalent amount of code. Accordingly, there are significant development labor savings due to the abstraction, consistency and quality benefits.

Existing art source Code generators may generally be divided into two types. Those types are code-driven source code generators and model driven source code generators.

A typical code-driven source code generator takes, as input, either existing source code or source code with additions in a defined mark-up language. A mark-up language is one which can be added to text files to transform the text itself or the way in which the text should appear. HTML, which is used to describe web content, is a common example of a mark-up language. Code-driven source code generators are typically used to help with the software development process via the generation of partial sections of new code or meta-data for maintenance purposes.

The advantages of code-driven source code generators are that they can be used with pre-existing source code bases. Furthermore, the operation is fairly straight forward and can be readily understood by software developers. This can yield advantages in terms of speed of development and easier maintenance.

One disadvantage of code-driven source code generators is that the input is generally platform specific. Consequently, a code-driven source code generator is typically limited to software developers with knowledge of the existing source code. This is typically because the input has implementation code mixed up with specification design information, thus providing low levels of abstraction. With active generation, the generator implemented code is generally mixed back with the input design thus providing even lower levels of abstraction. This makes it impractical for use in generating complete applications.

Prior art code-driven source code generators are exemplified by U.S. Pat. No. 5,875,333 to Fish, entitled Automatically Generating Source Code For Relating A Dialog Interface With A Business Object In A Computing Application, and U.S. Patent Application Publication No. 2002/0178434 to Fox, entitled Apparatus And Method For Automatic Source Code Generation In A Process Control Environment.

Model-driven source code generators, sometimes called declarative source code generators, do not use source code as its initial input. Rather, a model-driven source code generator uses an abstract design as input which specifies (declares) what the application is required to do. Using templates, a code database or the like, it is left to the source code generator to determine the implementation specifics. Prior art model-driven generators produce partial sections of new code or Meta Data, such as documentation, profile information, or complete code implementations. In each case, the output code is compiled with a framework compatible with an underlying technology platform and/or operating system.

The input to the model-driven source code generators is an interconnected group of abstract representations (i.e. a model) which declares what is required rather than statements of how things should be implemented. Each element in the model representation corresponds to an element or concept in the problem area (domain). Models are attractive because they allow a problem to be precisely described in a way that avoids technological detail. They allow the problem to be described using terms and concepts that are familiar to workers in the domain, rather than only in languages specific to software developers. Consequently, the model helps bridge the gap between customers and technology providers.

Models range from simple abstractions to models based on general purpose domain languages such as UML (Unified Modeling Language), through to the definition and use of Domain Specific Languages (DSLs). Models may take a diagrammatic and/or textual form. The underlying model concepts or elements are usually implemented via the use of interlocking object orientated components and/or patterns. Many model-driven source code generators commercially available today are based on the MDA-OMG (Model Driven Architecture by the Object Management Group) standard. This standard is based on models specified in UML with an initial platform-independent model being transformed into a platform-specific model which in turn is used to generate final code.

Model-driven generators are generally regarded as being better than code-driven source code generators for general applications. Model-driven source code generators provide high levels of design abstraction. This results in higher productivity gains for programming design teams. Furthermore, since the modeling input is not code specific, the input model can be platform-independent.

However, model-driven source code generators do have certain disadvantages. For instance, if model-driven source code generators are being used to design an application from scratch, the entire problem domain must be modeled. For new problems, this can be a difficult task. Generalizing the whole of a problem domain can be difficult and becomes more difficult still as the domain becomes wider and/or the level of abstraction higher. Implicitly, the problem domain must be fully understood. Often this occurs only after working code has been produced which is satisfactory to the customer. In many cases, producing the model can be more difficult than just manually producing the required source code. Furthermore, even where the problem domain is understood, it has been found that it can be very difficult to fully capture it in many cases due to the difficulties using generalized model constructs and concepts such as provided by UML, to express many real world concepts, activities and objects. In current practice, code generation is most often applied to well defined domains which can be readily formalized such as database access or user interface design. For complete applications, it is often still necessary to hand write a broad spectrum of code. Accordingly, full code generation is more successful when both the modeling language and the generator are very domain specific.

Even with such preparations, aspects of the solution, such as error handling, security, transaction control, concurrent access, remoting, debugging, etc. can be difficult to express in a cleanly localized way. And these problems increase as the problem domain becomes wider. Consequently, the development process usually ends up with a fragmentation problem; many small sections of code fragments are required in multiple places.

Additionally, applying model-drive source code generation to existing code bases is very difficult. This is due to the need for existing code to fit with the underlying modeling constructs and concepts. E.g. particular arrangements of object orientated programming. Extensive code modifications must typically be made in order to produce a framework of code templates to match the chosen modeling design system.

A recent approach aimed at countering the many outstanding issues with code generation systems is "generative programming". Relative to code generation, this approach promises to provide a standardized approach to capturing the problem domain via a process of "domain engineering". In domain engineering, problem domains are captured at a very high level of abstraction via a complex process of context analysis and modeling, in order to produce DSLs (Domain Specific Languages). A significant component of domain engineering is "feature modeling", which is used in order to overcome the inflexibility of generalized modeling languages such as UML. Feature modeling involves the activity of modeling the common and the variable properties of concepts and their interdependencies and organizing them into a coherent model. This helps limit modeling problems in the area of fragmentation. However, the problem of application to existing code bases remains as does the effort involved in the initial modeling process. Furthermore such systems operate with the implicit assumption that it is possible to capture the problem domain at the outset. In practice this is as much a business process issue as it is a technical issue.

U.S. Pat. No. 6,560,771 to Yotsukura, entitled System And Method For Reusing A Classed Method In Object Oriented Programming, discloses a system capable of being used on existing code provided said code is already fully object orientated. The system requires the user to be involved at the level of designing code classes based on existing classes and does not provide higher levels of design abstraction. It furthermore does not offer a solution to the fragmentation or domain modeling problems described above. U.S. Patent Application Publication No. 2006/0015856 to Lotter, entitled Modification Method For Modifying A Source Code, discloses a system where potential modification locations of the source code to be modified are pre-defined by means of comment markers placed in the source code. An input panel is used to provide modification data for each comment marker location. However, there is no input abstraction provided and no separation between the implementation and the input design modification. Also, the same design modification cannot be readily applied across different platforms. Furthermore, it requires an input panel entry for each comment entry thus making the process cumbersome for the user.

U.S. Pat. No. 5,448,740 to Kiri, entitled Generation Of A User Interface Code From A Corresponding Declarative Language Program, discloses a system where the modeling relates to the limited domain of user interfaces only and cannot be applied to existing code.

U.S. Pat. No. 6,093,215 to Buxton, entitled Method And Apparatus For Building Templates In A Component System, discloses a system for creating and distributing customized applications based on the modification of object orientated components via a template builder. This system can be applied to existing binary components rather than source code, provided they are fully object orientated with each object having a class definition and defined methods. Additionally each platform must have a run-time mechanism for executing the 'distribution packs' of components. There are, consequently, limitations placed on both existing applications and the platforms on which they run.

U.S. Pat. No. 6,876,314 to Lin, entitled Self-Generating Automatic Code Generator, discloses a system for producing code generators that avoid the issue of manual maintenance of generated code. A self-generating automatic code generator is described that maintains continuity with enterprise applications throughout development and maintenance of the applications. If a new feature is required by one application that would also be needed by the other applications within the organization, a programmer may add this new feature to the self-generating automatic code generator. However, it cannot be used on existing source code that has not been previously generated using the system. It requires explicit capturing and storing of the set of knowledge and rules the define the application and does not offer a solution to the fragmentation or domain modeling problems.

U.S. Pat. No. 6,408,431 to Heughebaert, entitled Method And Apparatus For Multiple Language Software Code Generation, discloses a system where generic multi-language code generation is created. Although the system is not platform dependent, the system requires a full model (input specification) of the features of the application to be generated. Accordingly, the system has the domain modeling problems of other prior art systems as well as the fragmentation problems associated with such a modeling technique. It also cannot be applied to existing code. U.S. Pat. No. 6,011,917 to Leymann, entitled Method and Computer system for generating Process Management Programs from Process Models, shows a model-based code generating system utilising a modeling language (FDL). However, the modeling provides low-levels of abstraction requiring the user to be involved in some aspects of implementation coding. The system is further limited to the domain of process management programs and cannot be applied to existing code.

U.S. Pat. No. 6,370,681 to Dellarocas, entitled Computer System And Computer Implementated Process For Representing Software System, shows a model-based code generating system that utilizes component building blocks in an attempt to solve problems of fragmentation. However, the system still requires a full model of the application domain. Accordingly, the system has the same domain modeling problems as other prior art systems. It also cannot be applied to existing source code unless the existing code is based on compatible software components.

The issues described above with the prior-art code generation systems currently lead many organizations to avoid the use of model-driven code generation. Code-driven generation can lead to some improvements in development time and costs. However, many organizations and software engineers regard the modest improvements as being outweighed by learning curve and maintenance issues.

A need therefore exists for a code generation method capable of being applied to existing source code which has the productivity and abstracted input advantages of model-driven code generation systems whilst reducing or avoiding the domain modeling and fragmentation problems. This need is met by the present invention as described and claimed below.

SUMMARY OF THE INVENTION

The present invention system and method provides a unique source code generation system which supports existing code but combines much of the benefits of the declarative model-driven and code-driven approaches to code generation. Utilizing the present invention can reduce the effort required in producing a new code generator. By focusing on change-models; an abstracted, platform independent declarative set of design changes for a specific application domain, rather than complete models of application domains, the process and effort involved in modeling and template production is made much easier. This is due to the fact that the complexity of both the templates and the models is considerably less than that of prior art model-driven systems used for generation of complete applications. In essence, embodiments of this invention can provide less effort, less risk and better quality in generating source code.

The system efficiently produces code since the generated code changes will often be relatively small compared to the entirety of the pre-existing code base. If code generation for complete applications is attempted with prior art systems, it can be very difficult to produce efficient code, particularly if multiple platforms are to be supported.

The present invention system also automatically customizes or generates the GUI used by application designers from the change-model. GUI extensions are optionally supported from internal elements defined within the change-model or from an external GUI-model file. This provides the application designer with a system GUI which can be specific or tailored to each application domain.

The system can be applied to making source code changes to existing source code bases, including non-object orientated source code bases, independent of the high-level language used or the platform/framework required. This can be done without significant source code refactoring or modification. Furthermore, the system is inherently domain independent. It can be applied to making source code changes irrespective of the type of application the source code generates and irrespective of particular functional areas (e.g. database, user-interface, business logic, etc. of the application.

The present invention system supports multiple platforms. A single change-model can be used by an application designer to define the changes for multiple platforms, operating systems and/or languages. Additionally, applications can be generated by application designers without specific software development skills.

Meta-Generator capabilities can be provided by the present invention system. As used by the present invention, a Meta-Generator is a generator of code generators. That is, it is a system capable of producing code generators which are in turn to be used to generate code aimed at specific application domains. Each change-model plus related set of application-templates, implicitly defines the code generator for a specific application domain.

The present invention system also supports concatenation of applets in order to produce larger applications with data transfer between the applets. As used by the present invention, an applet is a self-contained program, or mini-application, having its own input and output means and which may be used as part of a larger application.

In operation, the present invention system avoids introducing additional run-time framework or platform dependencies. Accordingly, the only dependencies are those required by the platform for the original program which the models/templates are based on.

By placing change-models and application-templates in binary assembly files (e.g. DLLs), the source code can be obscured from application designers where it is desirable to also enable the application designers to generate working applications. Alternatively, by providing an "emulation" platform different from the final target platform, application designers can generate and test new applications but not have access at all to the actual final application code, thus none of the source code for the target platform is exposed. By utilizing libraries which are called from the application-templates, the source code for the fixed non-customizable sections of applications can be hidden from designers. Consequently, the present invention system opens up application generation to customers and/or third parties whilst retaining manufacturer control over intellectual property.

DETAILED DESCRIPTION OF THE DRAWINGS

Although the present invention system can be used in countless programming development applications, the applicant has applied the system to the development of casino games. Accordingly, when providing examples of the programming system, the examples will be directed to an application where a casino game is being programmed. Such an embodiment is merely exemplary and is used for illustrative purposes only. The examples provided should not be considered limitations when interpreting the claims.

Figure 1:
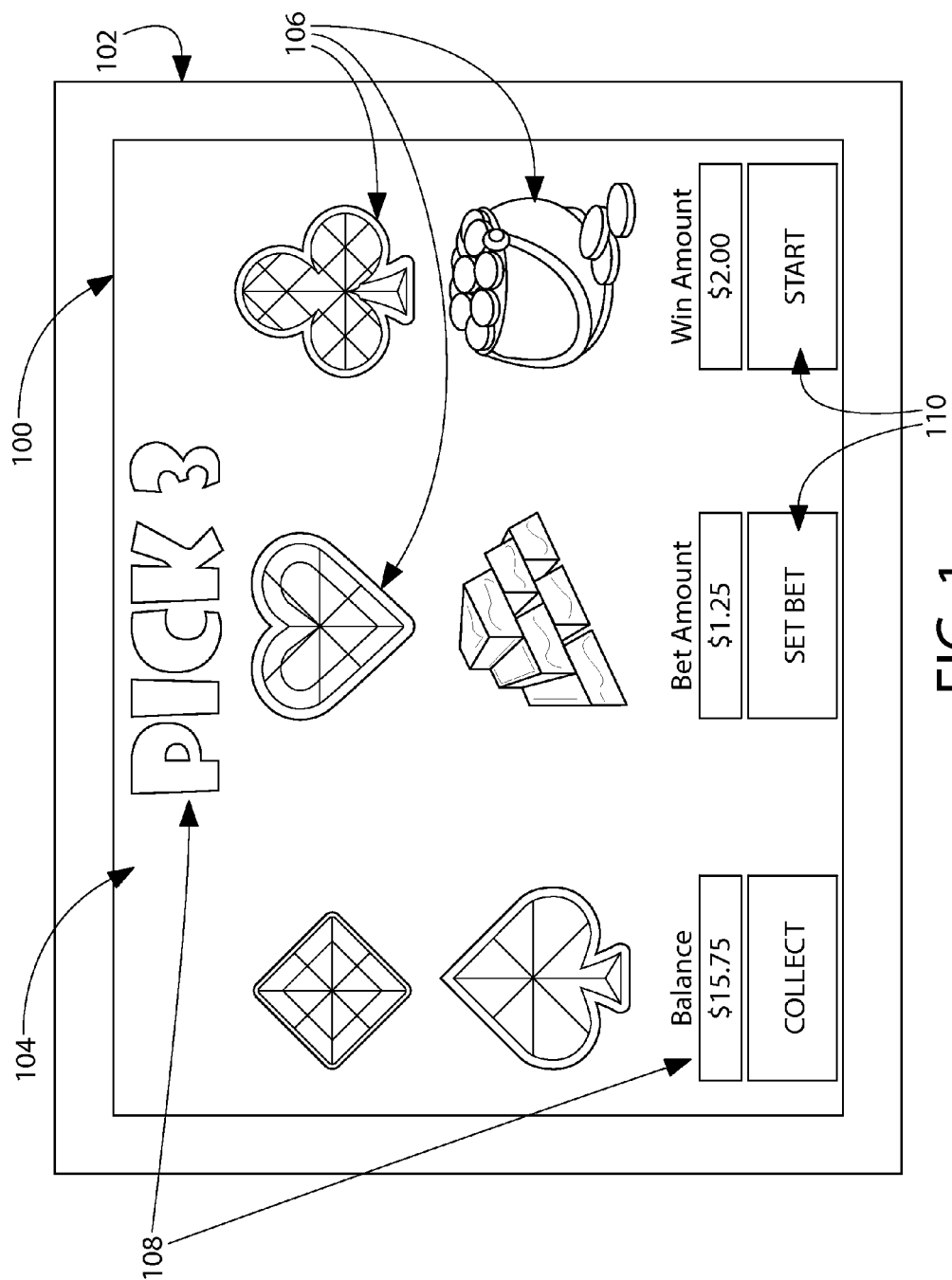
FIG. 1 shows a display screen of an exemplary embodiment of a "pick" game running on a video lottery terminal, which is a type of electronic gaming machine or slot machine used in casinos.

In a casino, there are many electronic gaming machines. One such gaming machine is a video lottery terminal, also known as a video slot machine. Referring to FIG. 1, a display 100 of a video lottery terminal 102 is shown. In a video lottery terminal 102, there is typically a touch screen 104. A person plays the video lottery terminal 102 by touching various prompt points on the touch screen 104.

In the example of FIG. 1, the touch screen 104 displays a "pick 3" game consisting of six symbols 106, three of which may be selected by the player. The pick images 106 are superimposed over background imagery 108. In addition, buttons 110 are provided on the touch screen 104 for use in placing bets, collecting credits and starting the game.

Since an electronic gaming machine is software driven, the game does not have to be physically replaced in order to alter the game. Rather, the software can be changed to produce an entirely new game whenever desired by a casino.

When developing a new game for an electronic gaming machine, there are many criteria that must be considered. For instance, for a Pick game, the number of on screen pickable symbols, the number of game symbols the player is required to pick and the replacement symbol and action to take place on each pick must be considered. In addition, a game programmer must determine the odds of players getting different numbers of successful game symbols (picks) and assigning credit wins so as to achieve a desired average win amount for players. The programmer must also be concerned with the aesthetics of the game and design background and foreground graphics that share a theme with the gaming symbols used for the pick symbols. Ergonomic concerns are also addressed with the placement of the various control buttons. Furthermore, many games have bonus rounds, where the primary graphics are replaced with secondary graphics of a completely different game. To a programmer, all of these variables are a declarative set. It will be understood that the general model of a casino pick game program are known. That is, there are many fully coded, tested and operational programs in existence. However, there are countless variations to the existing source code that can be programmed and the resulting games can look and behaviour very differently. Using the present invention system, such programming tasks are greatly simplified.

When producing complete applications, prior art code generation systems typically combine manually produced code with generated code in order to side step the domain modeling and fragmentation issues. The present invention system involves, in part, an inversion of this prior art development process. The approach involves using source code which has been previously produced and tested to a required level. Since the source code is functional, the modeling of a problem domain has been implicitly completed. Consequently, the "quality" of the source code is known. This existing source code is modified using a new combined model-driven and code-driven technique.

The methodology starts by creating change-models. Each change-model is created by examining the tested source code and determining possible changes in functionality, behaviour and/or appearance. For instance, a programmer may decide to permit changes to the number of slot reels, the speed and duration of reel spinning, the number of win lines, the number of gaming symbols for each reel, the sequence of those symbols and win amounts for certain alignments of symbols, etc. in a slot game. Accordingly, the programmer develops an abstract, platform independent declarative set of design changes. The abstract declarative set of design changes is the change-model.

For each abstracted representation in the change-model one or more sections of mark-up code is inserted into a copy of the tested source code in order to implement an application-template. The mark-up provides links to the change-model and also generalized implementations of source code changes.

Application designers arrange, configure and assign values to change-model elements in order to define a new application. Thus, an abstracted methodology is provided for applying transformations to a tested source code base in order to generate new source code for another application. Changes are typically aimed at a related or the same application domain as the original application. For each abstracted representation in the Change-Model we insert one or more sections of mark-up code into a copy of the existing source code in order to implement an application-template. The mark-up providing links to the Change-Model representations and generalized implementations of source code changes. A user interface, which is automatically generated from the change-model and/or an optional generator GUI model, is provided to enable application designers to arrange, configure and assign values to change-model elements (E.g. objects) in order define a new application. Thus, we have an abstracted mechanism for applying transformations to an existing source code base in order to generate source code for another application. A key concept here is the modeling of changes rather than blocks of complete functionality.

Figure 2:
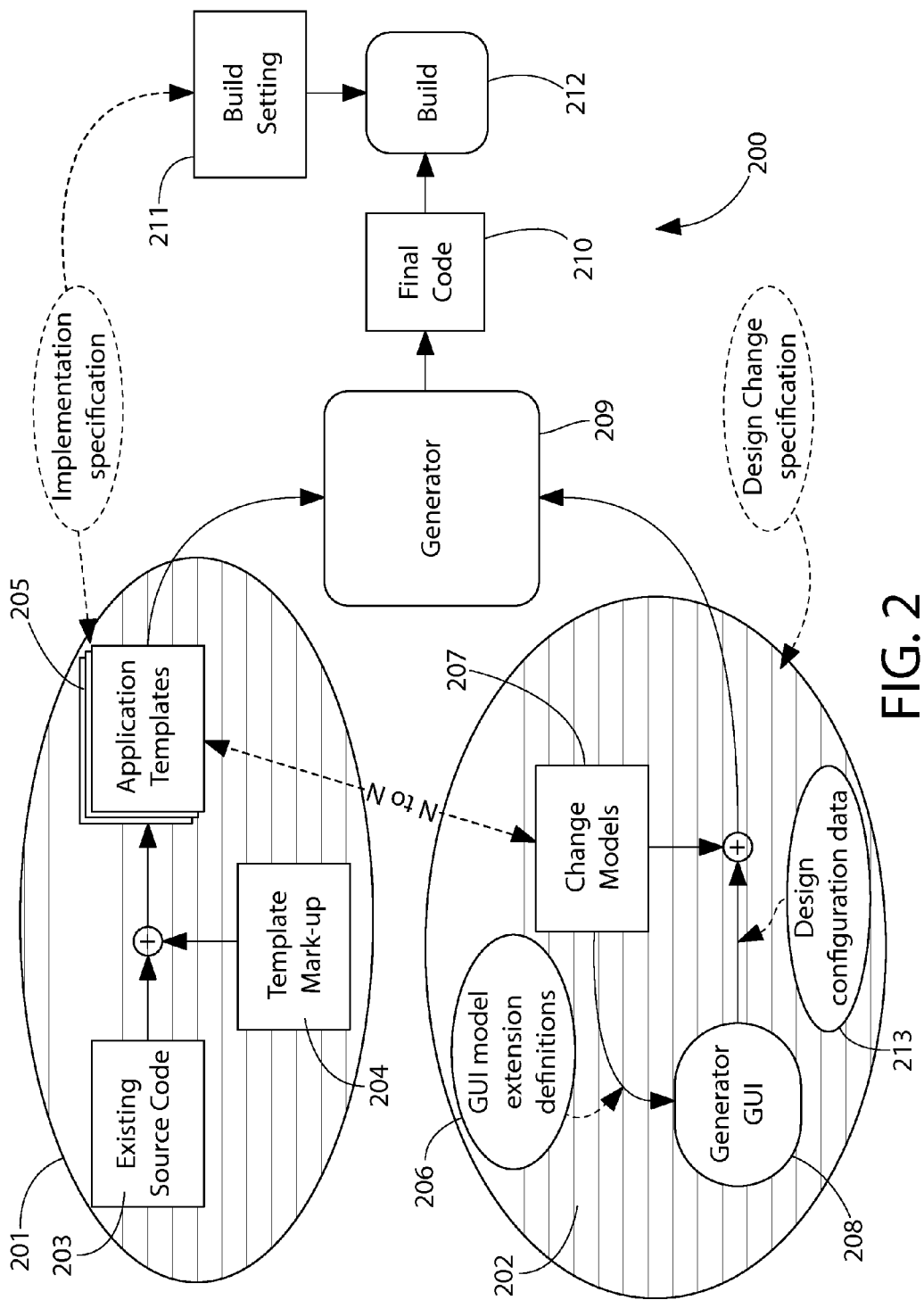
FIG. 2 is a simplified block of an embodiment of a change-model based source code modification generator.

Referring now to FIG. 2, an abstract of the overall system 200 is shown. From FIG. 2, it can be seen that code-driven components 201 specify implementation. Model-driven components 202 define the possible set of abstracted declarative design changes and the ways in which the application designer can interact with the system. In simplistic terms, the system 200 can be viewed as taking existing applications and using them as templates for specific, restricted application domains. The system 200 provides a mechanism for "stamping out" many variants of the original application. Some differing by a small amount, others by a larger amount so that it may appear to an end-user to be different applications.

An important element of the system 200 is the design "change-models" 207. As mentioned earlier, the change-models 207 provide an abstracted, platform-independent declarative model of the changes possible for a specific application domain. In essence, the application domains are being defined by the possible sets of changes. These sets are variations in a domain rather than just the fixed set of capabilities and features. Once change-models 207 have been produced for a specific application, those same models can be used for other implementations of the same basic design.

Application-templates 205 are generated by combining existing source code with additional mark-up code. The mark-up code is applied to provide mappings to the change-models 207 and generalized implementations of the design source code changes possible as defined by the change-models 207. In essence, the change-model 207 permits basic design re-use and the application-templates 205 permit implementation re-use. The system 200 is only limited by what can be described by a change-model 207 and implemented via an application-templates 205.

The GUI model extension definitions 206 define the facilities and appearance of the generator GUI 208 used to generate new applications for specific application domains as defined by the change-models 207.

The change-models 207 are platform-independent, abstracted declarative designs used to define the possible set of design changes for specific application domains. The change-models 207 may also have inputs/outputs defined for passing to or triggering another application or applet. An applet is a self-contained program, or mini-application, having its own input and output means and which may be used as part of a larger application.

The change-models 207 are separate from the detailed implementation source code application-templates 205. However, the change-models 207 and application-templates 205 are linked by each required change-model defined element (data type) having an associated section or sections in the template source code. There may be N sets of application-templates 205 for each of the change-models 207. The application domain is thus defined by the change-models 207 linked to an allied application-template set.

Existing source code 203 has C# template mark-up 204 added in a ASP/ASP.net style defined template language in order to produce completed application-templates 205. These are combinations of existing source code with additional mark-up code applied to provide both mappings to abstract representations of the change-model 207 and the generalized code implementations of the source code changes as defined by the change-models 207. For example, referring to the embodiment set forth in FIG. 1, the change-model section below enables an application designer to be able to specify winning and losing game symbols for each picked item:

```
@Sprite
type PickItem
{
    @ImagePath
    WinImage    : AssetPath;
    @ImagePath
    LoseImage   : AssetPath;
}
applet PickThree
{
    Items : PickItem[3 .. 9];
    // rest of the applet definition would be below here
    . E.g. other types and triggers.
}
```

The @Sprite and @ImagePath attributes are used to indicate which generator GUI extension definitions 206 should be used when applications are being designed using the change-models 207. For example, the @Sprite attribute tells the generator GUI 208 to allow the items to be manipulated using the GUI design surface and the @ImagePath specifies that the member is a path to an image. This enables the Generator GUI 208 to automatically bring up a file explorer dialog box for the designer to select an image. Additionally, if the application designer enters less than 3 pick items or tries to enter more than 9, constraint checking is used to advise the application designer via a GUI window.

In the source file of the associated application-template 205, a change-model 207 is declared and referenced as follows

```
<& PickThree pickmodel=(PickThree) input; &>
```

And used as follows:

```
private readonly string[ ] SelectWinFiles = {
    <& foreach ( PickItem item in pickmodel.Items)
    {
        if( item.Path != null && item.Path.Length > 0)
        {
            &>   @"<&= item.WinImage &>",
        <&
        }
    }
    &>
};
private readonly string[ ] SelectLoseFiles = {
    <& foreach ( PickItem item in pickmodel.Items )
    {
        if( item.Path != null && item.Path.Length > 0)
        {
            &>   @"<&= item.LoseImage &>",
        <&
        }
    }
    &>
};
```

In this example, basic constraint checking is performed during template processing to ensure that something has actually been assigned to each element of "PickItem" also. Lastly, during the code generation process the following section of final source code is generated;

```
private readonly string[ ] SelectWinFiles =
    { diamond.PNG, heart.PNG, club.PNG, spade.PNG,
    GoldBars.PNG, potOfGold.PNG   };
private readonly string[ ] SelectLoseFiles =
    { diamondLose.PNG, heartLose.PNG, clubLose.PNG,
    spadeLose.PNG, GoldBarsLose.PNG, potOfGoldLose.PNG   };
```

Note that the template language can be very different from that of the original source code. The template mark-up language is completely independent of the language in the original source code files.

The basic operation of the simplified embodiment shown in FIG. 2 is as follows: an application designer individually starts the generator GUI 208 and selects from the Change-Models 207. The generator GUI 208 is automatically updated as a result of the change-models 207. Using the updated generator GUI 208, the application designer enters design configuration data. This data is applied to an instantiated change-model 207.

A generator 209 is provided. The generator 209 has a means of decoding template mark-up, a means of decoding change-models 207 and means of linking change-model types to associated sections of application-template source code. It takes the application-templates 205 and change-models 207 and generates final source code 210. Where compilation is required, this is accomplished via a build engine 212 with technology and platform/operating system specific settings passed from the build settings block 211.

Each change-model 207 may be used with multiple application-templates 205. Consequently, multiple platforms/operating systems may be supported due to the separation of design from implementation specification, and from build settings 211. Meta-generation facilities; the facility to generate domain-specific code generators, are inherent as a generator 209 is defined by a specific change-model 207 plus an associated application-template 205. change-models 207, may also have optional GUI-Model extension definitions 206, which define additional facilities, thus making the design process easier for specific application domains.

Figure 3:
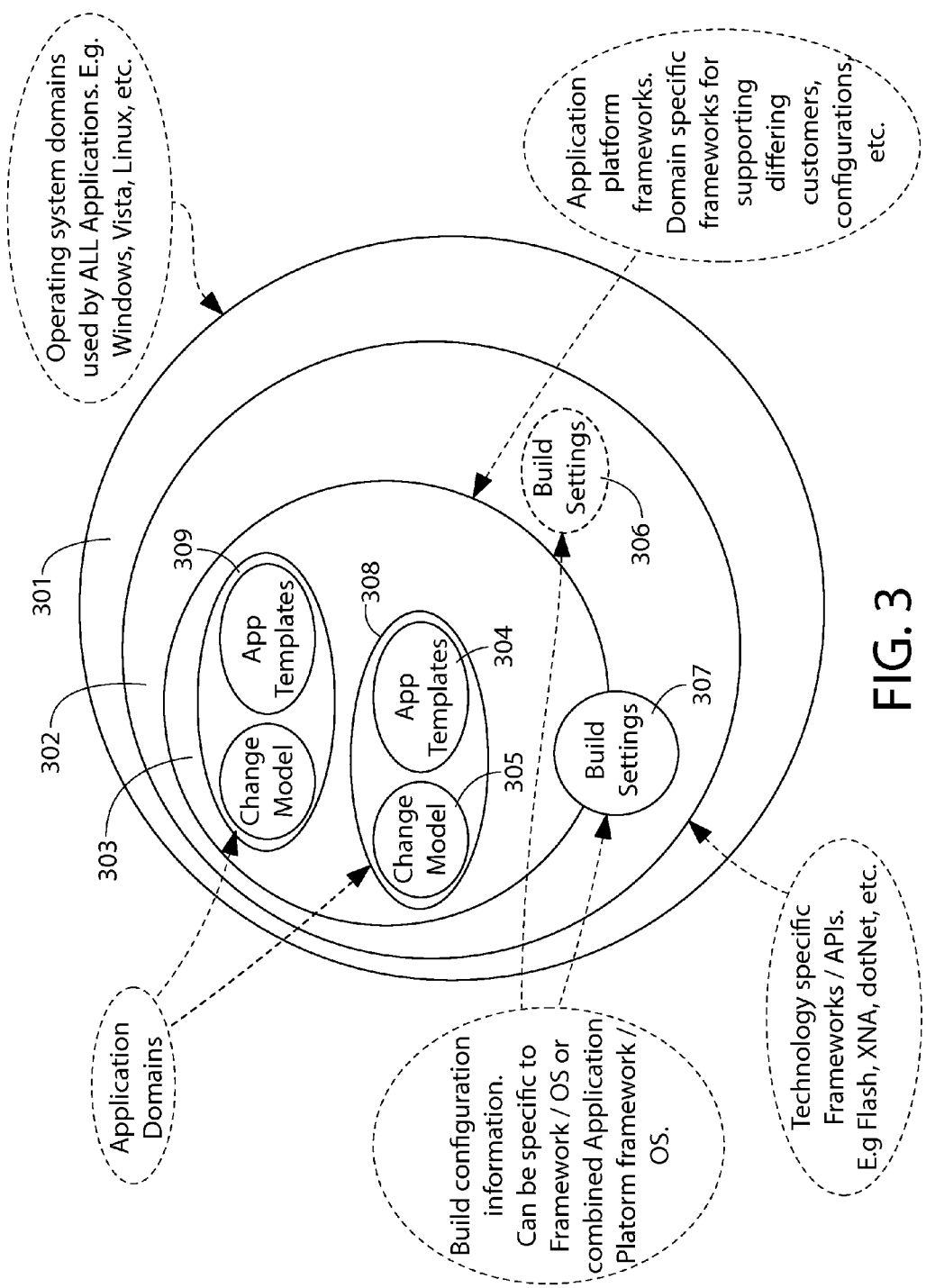
FIG. 3 shows the relationships between the specific application domains and the underlying application platforms, technology frameworks, and operating systems.

Referring to FIG. 3, an application domain representation 300 is provided. The application domain representation 300 illustrates the relationships between the specific application domains and the underlying application platforms, technology frameworks and operating systems.

Application Domains 308 and 309 are application areas with specific sets of possible design changes as defined by the combination of the declarative abstracted change-models 305 plus the implementation application-template 304.

The application platform 303 is a framework for supporting differing variants of specific application domains, different customers or different technology frameworks, for example.

The technology framework 302 is a technology-specific development framework or API providing interfaces and additional functionality on top of an operating system. Adobe Flash, Microsoft XNA, Microsoft .NET V3.0, and Java Swing, etc. are all examples of these types of interfaces.

Specific application domains 308 are represented by combinations of change-models 305 and application-templates 304. The application domains 308 and 309 are part of a wider application platform framework 303. This in turn is typically part of a wider set of technology specific frameworks 302. It should be noted that in many cases, the application platform framework 303 and technology platform frameworks 302 are combined in practice but for conceptual clarity they are separated here. Finally, the technology platform frameworks 302 are part of a wider still set of operating systems 301. FIG. 3 illustrates further that embodiments may have configuration-specific information 307 and 306 encapsulated and separated still from source code implementation as represented by the application-templates.

Figure 4:
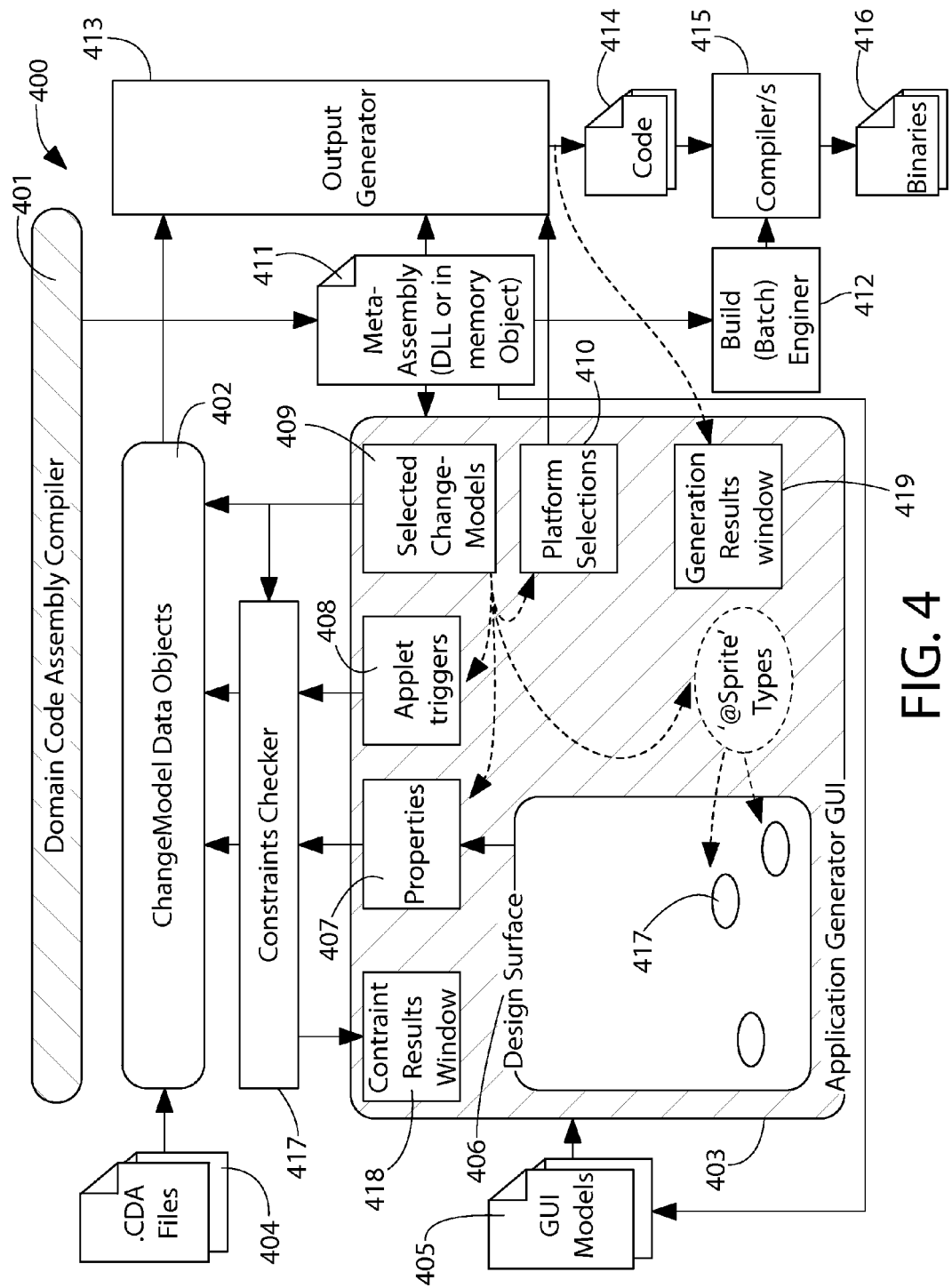
FIG. 4 is a schematic block diagram of an embodiment of a change-model based application generator.

Referring now to FIG. 4, a schematic block diagram is shown of an embodiment of a change-model based application Generator 400 that utilizes a Meta-Assembly as part of the generation process. The embodiment is composed and constructed of software objects or processing means as described below.

At generator start-up, the domain-code-assembly compiler 401 produces a binary Meta-Assembly file 411. The Meta-Assembly file 411 contains embedded application-template source code data, change-model definitions, GUI model extensions data, and platform-build settings as is later described in conjunction with FIG. 5.

The change-models 409 selected by the application designer are retrieved from the Meta-Assembly object and the change-model objects 402 are instantiated. Alternatively, the instantiation of change-model data objects 402 may be done via loading of a previous change design application file (.CDA) 404 for modification. The .CDA is a serialized data file of the completed application changes/customizations for a particular application domain, in other words, the inputs from a previous application design session.

The GUI model is used to describe the set of attributes defining the facilities and appearance of the application generator GUI. Embodiments may include a separate GUI model file 405, which may be used to define generator GUIs. Generator GUIs are general to a number of application domains and/or attributes defined within a change-model to define generator GUIs specific to the application domain.

The design surface 406, is a graphical workspace which is used to represent graphical elements of the generated application. The surface is a WYSIWYG graphical representation of change-model types with the @Sprite attribute used in order to facilitate easy manipulation of these types. The surface is used where it makes sense to manipulate elements in a graphical fashion. However, non-graphical types may optionally be assigned place holder locations on the surface. That is, non-graphical types can have the @Sprite attribute assigned but ignore the position values. All types declared in the change-model applet class will have values/settings in the properties window. As the types are manipulated on the surface, values are updated in the properties table and displayed in the properties window 407.

The change-model instantiated applet class objects 402, are persisted in memory and updated with design changes as the application generator GUI 403 is operated. The designer assigns or re-assigns values to the change-model defined user types via the GUI applet triggers table 408 and the properties window 407, as well as via manipulation of user types with @Sprite attributes 417, via the design surface 406. As values are assigned, the constraint-checker 417, ensures that any model-defined design rules are maintained.

When the application design user has completed the application design process and assigned values to all of the required change-model types, the desired platform 610 is selected by the designer. The selection of the platform initiates the actual code generation process. Firstly, any final pre-generation platform-specific constraint checking is done by the generator 413. These constraints are defined in special "<ChangeModelName>.constraints" data objects (files) in the Meta-assembly object. If constraint checks fail, the user is advised which types and values are in error via the generation results/error window 419 and the generation process is halted. Otherwise, the output generator 413 generates the final application source code by applying the constraint checked change-model objects 402, which have values assigned via the GUI, to the appropriate application-templates from the Meta-Assembly 411. This is done based on the application designer's "platform selections" and other output selections 410, such as desired destination folders. The final source Code 414 is passed to the appropriate compiler 415 and the Meta-Assembly defines post generate steps completed by the build engine 412 in order to produce the final application binaries 416. The build steps are accomplished via batch engine and may optionally include linking with libraries or not compiling at all where the output language is interpreted rather than compiled. Virtually any number of post generate steps may be defined via the use of a standard command line batch process such as the Windows Cmd. If errors occur, the build engine pops up a standard dialog box to show the error.

Figure 5:
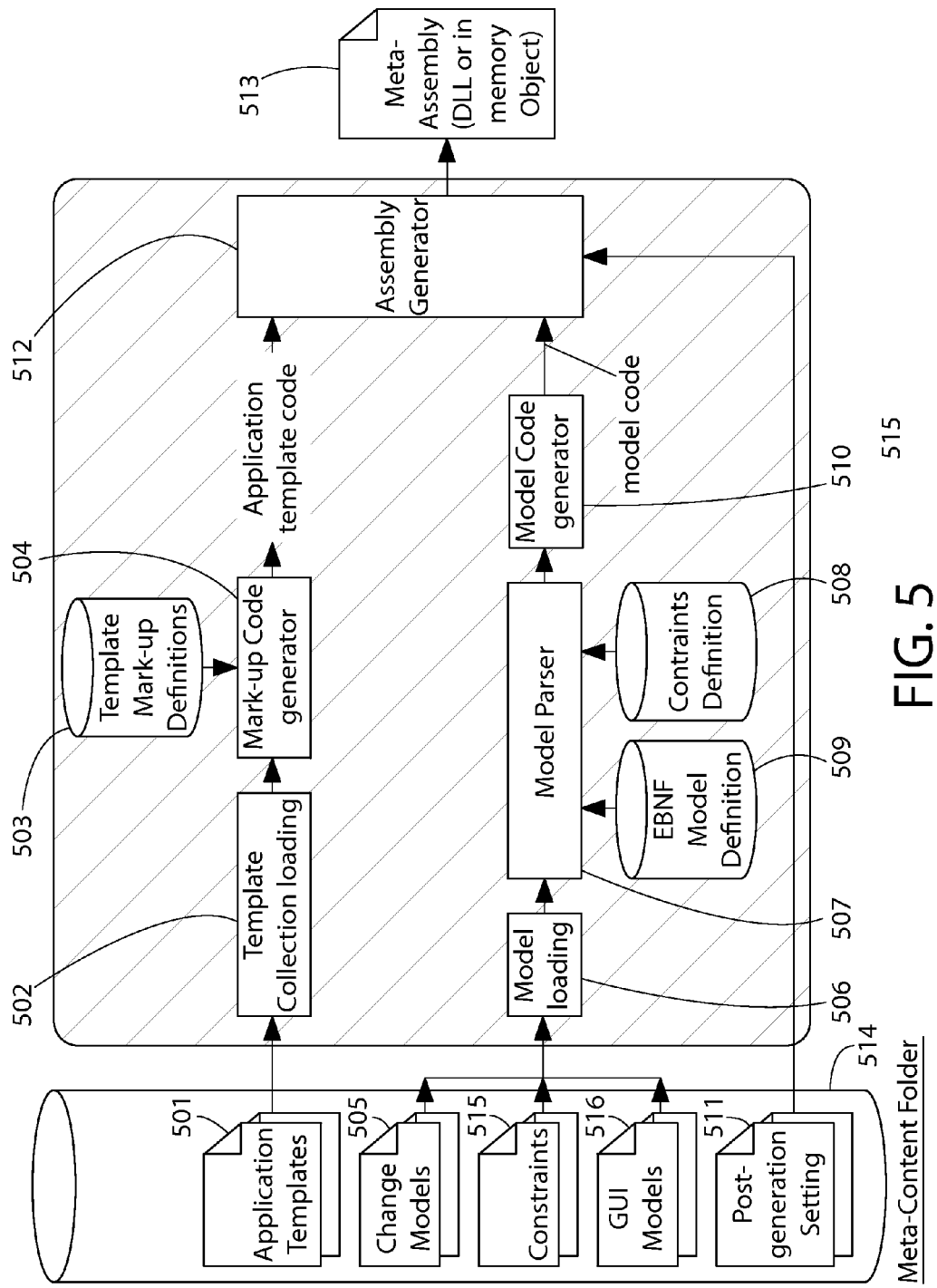
FIG. 5 is a schematic block diagram of an embodiment of a domain code assembly compiler.

Referring to FIG. 5, a schematic block diagram of a domain code assembly compiler 500 is shown. A software engineer or developer initially produces the Meta-Content documents which define the specific application design-change and implementation domain. The Application-Templates 501 contain original source code in any language modified with mark-up using an embodiment defined mark-up language. The change-models 505 are implemented in an embodiment-defined model language. These models may optionally contain generator GUI extension declarations and/or platform-independent design constraints. Optional platform-specific design constraints 515 may also be added along with the post code generation build engine batch file commands and settings, 511. The optional GUI model extension definitions 516 are read, which are independent of individual change-models.

From the Meta-Content folder 514, an assembler loader 506 loads all change-models 505, all separate platform-specific constraint files 515 and all independent GUI models 516. The parser 507 uses the EBNF definitions 509 and constraint definitions 508 to produce an abstract syntax Tree (AST)

output as per known art. This output tree is converted into a C# data structure by the model code generator 510.

All application-templates 501 within the Meta-Content folder are loaded by the template collection loader 501. Several templates may refer to a single model. The embodiment mark-up definitions 503 are used by the mark-up code generator 504 to process the mark-up and produce the template output C# data.

The assembly generator 512 is passed the C# generated from the templates 504, the C# generated from the models 510, and the post generation "build" settings 511 data. The assembly generator 512 compiles this data into the Meta-Assembly 513. The Meta-Assembly object may take the form of a binary file to provide obscuration and/or source control facilities or in a memory object. The Meta-Assembly 513 does not maintain or contain the data needed to define an actual application. It contains all of the design change, constraints, implementation code and build settings information needed for the supported application domains.

Example Operation

Figure 6:
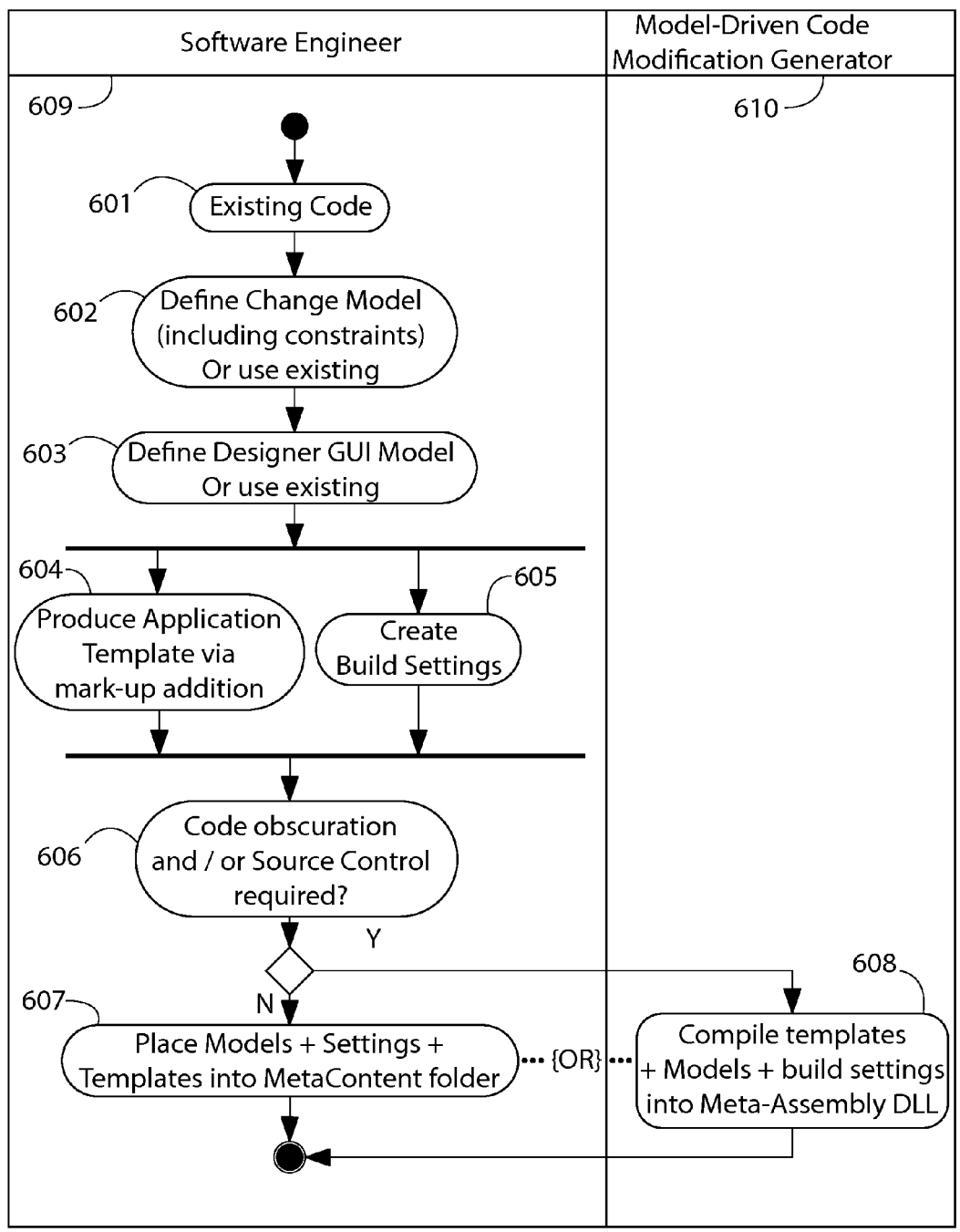
FIG. 6 is a block flow diagram demonstrating a series of steps associated with the production of the domain code (Meta) content or assembly required in some embodiments.

Referring to FIG. 6, a block flow diagram is provided that demonstrates a series of steps associated with the production of the domain code Meta Content required in some embodiments. FIG. 6 is a UML style activity diagram showing both the software engineer sequence of operations (workflow) 609 to be carried out for each application domain prior to the generation of new applications and the parallel operations performed by the embodiment of the model-driven code modification generator 610.

Starting with existing code 601, a software engineer knowledgeable in the desired specific application domain, as it applies to the existing source code 601, defines a change-model 602. In a typical embodiment, the model is a set of declarations defining the possible set of changes or customizations to the existing code pursuant to a desired application domain related to the application generated from the existing code. In many cases, the new domain will simply consist of a generalized version of the existing application. Note that an existing change-model may be utilized. A GUI model 603 is then optionally defined. In its most basic form, the GUI model 603 simply defines various GUI elements useful for producing an application for the specified domain, e.g. a table viewer for a database or a tree view for a file system. GUI models enable application designers, who ultimately are the end users of the system described herein, to leverage the benefits of the system. The application of GUI models or extensions can reduce the software programming skills required by application designers.

A Sample GUI-Model attributes file is shown below:

```
<attributes>
    <file_browser name="ImagePath" filter="Image
Files(*.JPG;*.PNG)|*.JPG;*.PNG|All files (*.*)|*.*" />
    <file_browser name="SoundPath" filter="Sound
Files(*.mp3)|*.mp3|All files (*.*)|*.*" />
    <folder_browser name='FolderPath' />
    <extern_dialog name='DatabaseTable'
        assembly='DBExtension.dll'
        function='DBExtension.Dialog.Display'/>
</attributes>
```

In the example above "file_browser" declares an attribute that will enable the designer to browse for a file and "filter" is the description and list of the file extensions to look for. "Folder_browser" declares an attribute to permit browsing for a folder. "Extern_dialog" declares an attribute that will call a function in a developer supplied assembly when a designer attempts to manipulate a Change-Model type with the assigned attribute (E.g. @DatabaseTable).

Once the change-model and GUI model are in place, the application-template 604 is produced by adding mark-up to each section of the existing code where data from the change-model can lead to changes in the source code. It should be noted that although this is a critical step, along with that of defining the change-model, both steps need only to be done once. Framework/API/Operating system specific settings 605 are also created at this point, should code obscuration and/or control over the source code is required. The domain meta-content, namely the change-models, separate GUI-models, application-templates, platform-specific constraints and build settings are compiled into an assembly DLL using the domain code assembly compiler 608. Alternatively, the domain/Meta-content is placed in a distribution folder 607.

Figure 7:
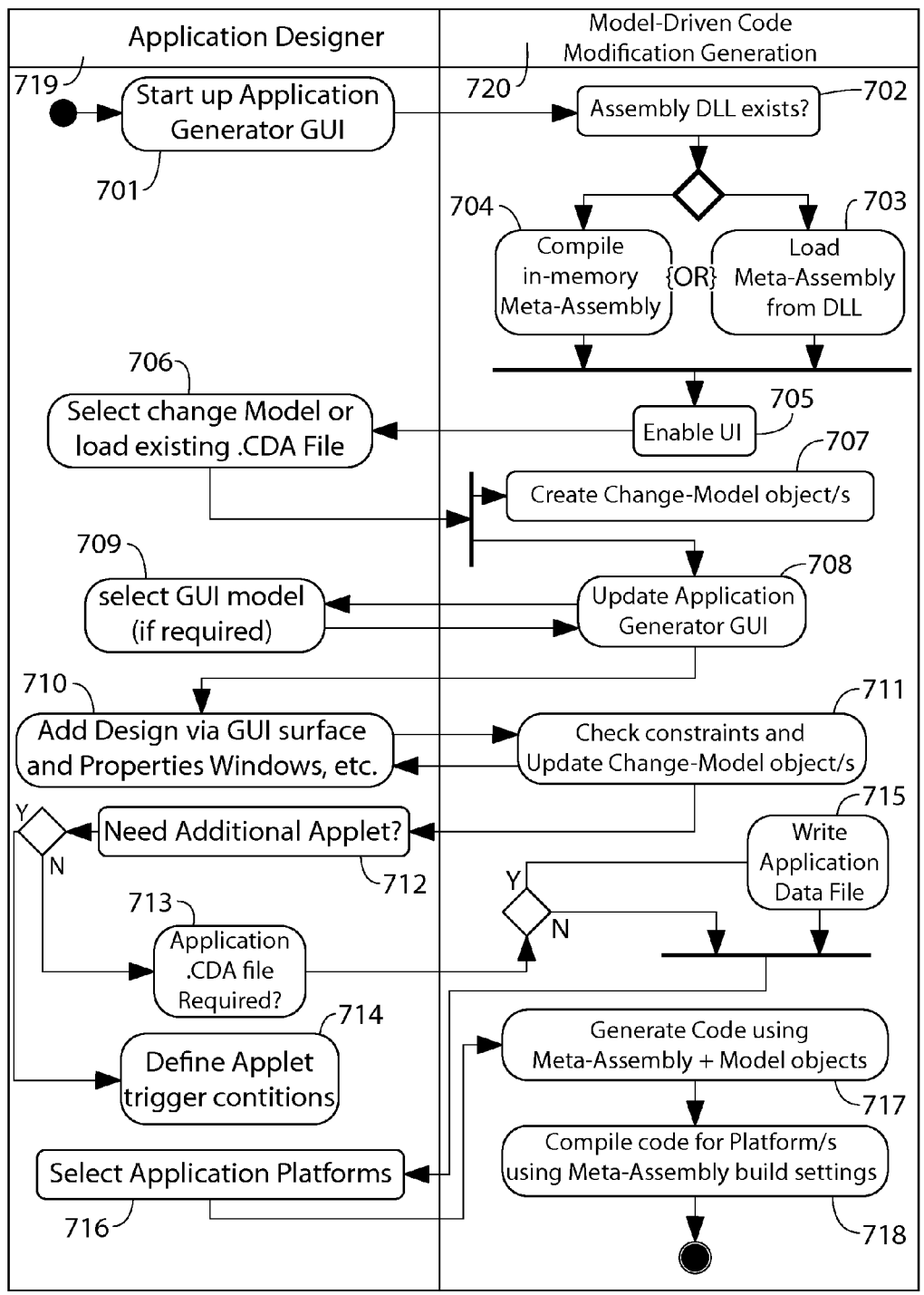
FIG. 7 is a block flow diagram demonstrating a series of steps associated with the generation of source code for a new application as required in some embodiments.

FIG. 7 is a block flow diagram demonstrating a series of steps associated with the generation of source code for a new application as required in some embodiments. FIG. 7 is a UML style activity diagram showing both the application designer sequence of operations (workflow) 719 to be carried out in order to generate a new application and the parallel operations performed by the embodiment of the model-driven code modification generator 720.

The application designer 719 will typically be someone skilled in the application domain but not necessarily in the art of computer source code production. Upon start-up of the generator graphical user interface 701, the generator 720 checks for the existence of a pre-compiled domain meta-content assembly 702. If the assembly DLL exists, the assembly object is loaded into memory 703, otherwise an assembly object is complied into memory 704 from a Meta-Contents folder containing the Change and GUI models, application-templates and application build settings. The user interface 705 is then enabled permitting the application designer to select a change-model or load an existing change design application file as shown in block 706. The selection of a change-model causes the generator to create an internal change-model object 707 and update the generator GUI 708 with change-model specific GUI interfaces. The application designer may then optionally select alternative GUIs 709. Using the selected GUI, the application designer then proceeds to make the required changes 710. This is accomplished by using the GUI design surface and various property windows to define any required resources, configurations and data values. As this process proceeds, the internal change-model objects are updated 711. When the applet design is complete 712, the application designer can define applet trigger condition(s) 714 and then return to step 706 in order to select an applicable new applet to be part of the new application. Alternatively, if no further applets are required, the user can optionally save an application .CDA data file 713 and 715. The user then selects the desired platform 716 that the final application will run on from a list of available platforms. The available platforms applicable to an application domain as determined by the loaded change-models is maintained in the Meta-assembly. The final source code is then produced using the application-templates in the Meta-Assembly and the change-model objects are updated via changes made using the Application Generator GUI, as shown in block 717. Finally, using the build settings maintained in the Meta-assembly the application binaries are built 718. This assumes the final code needs to be compiled rather than interpreted in which case step 718 is skipped.

Other Embodiments

It will be understood that many other modifications and variations of the present invention system are possible. For example, a change-model can be used to make changes to embodiments of this invention itself. The Meta-Content can be stored in a database rather than a collection of files in directory folders.

Furthermore, in addition to, or instead of, utilizing application-templates with mark-up applied, other means of producing generalized implementations of design changes (source code changes) mapped to defined Change-model abstracted representations and of mapping the generalized source code implementations to associated sections of the specified existing source code, can also be utilized. For example, an explicit change-model mapping table could be utilized. This table would be produced by software engineers as a pre-generation step and it would map selected sections of existing source code, change-model representations, e.g. User-Types, and sections of generalized implementation coding, e.g. sections of code as would be in mark-up sections. Alternatively, parsing of the selected existing code sections could be used along with code transformation rules and pre-existing "generalized code snippet" templates in order to produce generalized implementation code sections linked to change-model representations and mapped to selected existing code sections. For example, if the selected existing source section is "Win_images=[smile.jpg, laugh.jpg, happy.jpg];", the change-model representation to be used is Pickthree-.Items, and the transformation rule is something like "Array_content_replace". Parsing of the selected source section, along with additional software engineer input where required, e.g. specifying item.WinImage), could be used to generate:

```
Foreach ( PickItem item in PickThree.Items)
{
    If (item.Path != null && item.Path.Length > 0) {
    WriteFormat("r\"{0}\", ", item.WinImage); }
}
```

In effect, the transformation rule is used to select a code snippet and the change-model representations to customize it. When the application designer uses the generator GUI to provides values e.g. happytoy.bmp, greentoy.bmp and bluetoy.bmp) the generated section would finally be Win_images=[Happytoy.bmp, greentoy.bmp, bluetoy.bmp];

A mark-up "helper" component could be used to reduce the manual effort required in producing specific application-template mark-up sections. This could be accomplished, for example, by maintaining a database of mark-up code snippets. The software engineer would provide sections of existing source code and, optionally, specific change-model abstracted representations (user-types) as inputs. A specialized source code parser could then be used to analyze the code sections and provide suggested mark-up code section(s), which could be edited, if required, by the software developer. Alternatively, the relevant mark-up code snippets could be manually selected from the database.

A mixed mode embodiment could utilize both the invented method and prior-art code generation techniques. The change-model and/or constraints handling could be implemented via an external script language rather than the EBNF defined Change-model language. The saved change-design-application (.CDA) file could have resources such as fonts, images and sound etc embedded internally to facilitate easy redistribution of what is needed in order to re-generate and compile changed source code.

Versioning information can be provided to enable the detection of updated change-models and/or application-Templates. This would enable application designers to be automatically advised of which applications to rebuild.

All such variations, modifications and alternate embodiments are intended to be included within the scope of the present invention as defined by the claims.

What is claimed is:

1. A method of automatically generating source code for a programming application, said method comprising the steps of:
providing existing source code to be used in part for said programming application;
testing said existing source code for functionality to create tested source code;
creating abstracted change model representations of a possible set of changes for said tested source code, wherein each of said abstracted change model representations is a change-model and said change model representations collectively are change-models;
creating application templates by applying mark-up language to said tested source code;
producing generalized implementations of source code changes utilizing said application templates;
mapping said generalized implementations of source code changes to at least one selection of a grouping containing said change-models and said tested source code to produce mapped sections of code;
accepting inputs in to arrange, configure and assign specific values for said change-model representations; and
selectively transforming, in any combination, said tested source code, said change-model representations, said specific values, said generalized implementations and said mapped sections of code in order to produce new source code.

2. The method according to claim 1, wherein said step of mapping said generalized implementations utilizes said application templates.

3. The method according to claim 1, wherein said step of producing generalized implementations of source code changes involves selectively transforming, in any combination, said tested source code, said change-model representations, said specific values and said application templates.

4. The method according to claim 1, further including the step of providing at least one user input interface for accepting inputs.

5. The method according to claim 4, wherein said at least one user input interface is automatically generated from said change-models.

6. The method according to claim 4 wherein said at least one user input interface is generated by use of a GUI model consisting of a series of definitions of the user interface.

7. The method according to claim 1, further including the step of generating applet subroutines that generate applet source code.

8. The method according to claim 7, further including the step of concatenating said applet source code of multiple applet subroutines.

9. The method according to claim 7, further including the step of running said applet subroutines only upon occurrence of defined trigger conditions.

10. The method according to claim 1, further including the step of storing said change-models and said application templates into a binary Meta-assembly file.

11. The method according to claim 1, further including the step of storing said change-models and said application-templates into a database.

12. The method according to claim 10, further including the step of obscuring said Meta-assembly file.

13. The method according to claim 1, further including the step of storing said inputs into a separate file and retrieving said inputs for purposes of replication.

14. A method of altering a computer game program, comprising the steps of:
   providing existing source code for a computer game program;
   testing said existing source code for functionality to create tested source code;
   applying mark-up language to said tested source code to create application templates;
   creating abstracted representations of a possible set of changes for said tested source code;
   producing generalized implementations of source code changes using said application templates;
   mapping said generalized implementations to produce mapped sections of code;
   selectively transforming sections of code from said tested source code, said abstracted representations, said generalized implementations, and said mapped sections to produce new source code.

15. The method according to claim 14, further including the step of utilizing said application templates to map said generalized implementations to sections of said working source code.

* * * * *